United States Patent
Deng et al.

(10) Patent No.: US 8,803,563 B2
(45) Date of Patent: Aug. 12, 2014

(54) SOURCE-ELECTRODE DRIVING CONTROL CIRCUIT AND CONTROL METHOD THEREOF

(71) Applicant: Silergy Semiconductor Technology (Hangzhou) Ltd, Hangzhou (CN)

(72) Inventors: Jian Deng, Hangzhou (CN); Chen Zhao, Hangzhou (CN); Qiukai Huang, Hangzhou (CN)

(73) Assignee: Silergy Semiconductor Technology (Hangzhou) Ltd., Hangzhou (CN)

( * ) Notice: Subject to any disclaimer, the term of this patent is extended or adjusted under 35 U.S.C. 154(b) by 0 days.

(21) Appl. No.: 13/971,028

(22) Filed: Aug. 20, 2013

(65) Prior Publication Data

US 2014/0055168 A1 Feb. 27, 2014

(30) Foreign Application Priority Data

Aug. 24, 2012 (CN) .......................... 2012 1 0303541

(51) Int. Cl.
*H03K 3/00* (2006.01)
*H02M 1/00* (2006.01)

(52) U.S. Cl.
CPC .............. *H02M 1/00* (2013.01); *Y02B 70/1491* (2013.01)
USPC ........... 327/108; 327/110; 327/306; 327/312; 363/21.01

(58) Field of Classification Search
USPC ................. 327/108–110, 306, 309, 312–314; 363/21.01, 21.02, 21.03; 361/56–57, 361/91, 91.5, 91.6, 93.7
See application file for complete search history.

(56) References Cited

U.S. PATENT DOCUMENTS

| 7,426,120 | B2 * | 9/2008 | Yang et al. | 363/21.15 |
| 8,587,964 | B2 * | 11/2013 | Yang et al. | 363/21.02 |
| 2011/0228565 | A1 * | 9/2011 | Griffin | 363/21.01 |
| 2012/0299561 | A1 | 11/2012 | Chen et al. | |

FOREIGN PATENT DOCUMENTS

CN 101789680 A 7/2010

* cited by examiner

*Primary Examiner* — An Luu
(74) *Attorney, Agent, or Firm* — Michael C. Stephens, Jr.

(57) ABSTRACT

Disclosed are driving control methods and circuits for quasi-resonant control of a main power switch of a switching power supply. In one embodiment, a driving control circuit can include: (i) a clamp circuit coupled to a gate of the main power switch, where the clamp circuit is configured to clamp a voltage of the gate to a clamping voltage that is greater than a threshold voltage of the main power switch; (ii) a valley voltage detection circuit configured to activate a valley control signal when a drain-source voltage of the main power switch is at a resonance valley level; and (iii) a source voltage control circuit configured to reduce a voltage of a source of the main power switch to turn on the main power switch in response to the valley control signal being activated.

11 Claims, 11 Drawing Sheets

US 8,803,563 B2

SOURCE-ELECTRODE DRIVING CONTROL CIRCUIT AND CONTROL METHOD THEREOF

RELATED APPLICATIONS

This application claims the benefit of Chinese Patent Application No. 201210303541.2, filed on Aug. 24, 2012, which is incorporated herein by reference in its entirety.

FIELD OF THE INVENTION

The present invention relates to a quasi-resonant control circuit for a switching power supply, and in particular, to a source driving control circuit and an associated control method.

BACKGROUND

High frequency switching is an important aspect of switching power supplies. High frequency switching can greatly reduce the size and weight of switching converter, and also improve converter power density. In order to realize high frequency operation, switching losses should be reduced. Soft switching technology is one method of reducing such switching losses. In soft switching, voltage or current of a switch in a switching converter can change according to sinusoidal or quasi-sinusoidal properties through principles of resonance. For example, when a voltage crosses zero, the switching device may be turned on, and when current crosses zero, the switching device may be turned off.

SUMMARY

In various embodiments, quasi-resonant driving control of a main power switch of a switching power supply can be realized. In one embodiment, a driving control circuit can include: (i) a clamp circuit coupled to a gate of the main power switch, where the clamp circuit is configured to clamp a voltage of the gate to a clamping voltage that is greater than a threshold voltage of the main power switch; (ii) a valley voltage detection circuit configured to activate a valley control signal when a drain-source voltage of the main power switch is at a resonance valley level; and (iii) a source voltage control circuit configured to reduce a voltage of a source of the main power switch to turn on the main power switch in response to the valley control signal being activated.

In one embodiment, a method can include: (i) clamping a gate voltage of a main power switch at a clamping voltage that is greater than a threshold voltage of the main power switch; (ii) activating a valley control signal when a drain-source voltage of the main power switch reaches a resonance valley level; and (iii) reducing a source voltage of the main power switch to turn on the main power switch in response to the valley control signal being activated.

Embodiments of the present invention can provide several advantages over conventional approaches, as may become readily apparent from the detailed description of preferred embodiments below.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set fourth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1A:
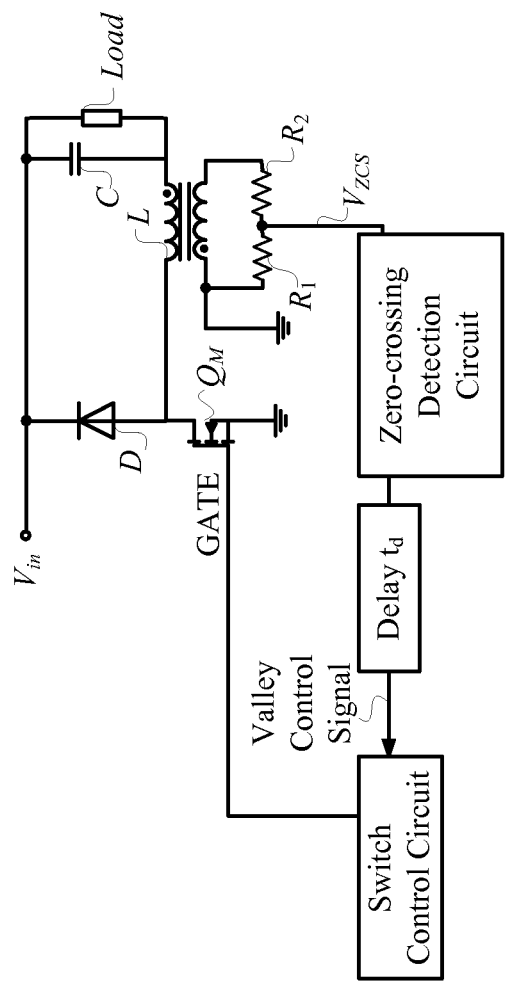
FIG. 1A is a block schematic diagram of an example quasi-resonant driving control circuit.

Referring now to FIG. 1A, shown is an example quasi-resonant driving control circuit. In this particular example, the topology of the main circuit is a floating buck circuit e, and quasi-resonance can drive main power switch $Q_M$ of the power stage circuit by using auxiliary winding detection. The auxiliary windings may be coupled with an inductor in the main circuit, and voltage signal $V_{ZCS}$ of drain-source voltage $V_{ds}$ of main power switch $Q_M$ may be utilized by a bleeder circuit with a parallel connection as shown.

Figure 1B:
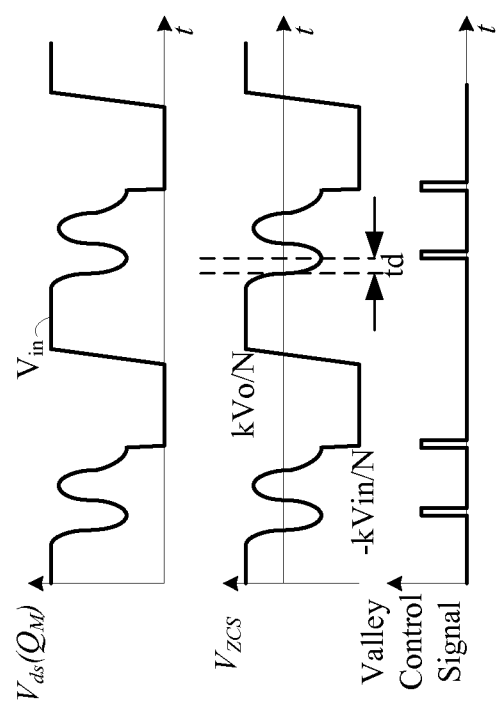
FIG. 1B is a waveform diagram of example operation of the quasi-resonant driving control circuit shown in FIG. 1A.

Viewed in conjunction with FIG. 1B, a negative zero-crossing of voltage signal $V_{ZCS}$ may be detected by a zero-crossing detection circuit, and a corresponding negative zero-crossing signal can be output to a delay circuit. The negative zero-crossing signal of voltage signal $V_{ZCS}$ can be delayed by a predetermined time, and a "valley" signal can be output to characterize the moment when voltage signal $V_{ZCS}$ reaches a valley. For example, a valley can be a local minimum or low point (e.g., a low voltage, a low current, etc.) in the particular signal. The switch control circuit can control main power switch $Q_M$ to turn on in response to the valley signal.

In this approach, additional auxiliary windings may be needed. Also, this delaying approach may result in the valley control signal not precisely matching the valley "moment" or precise valley or low (e.g., local minimum) signal time of the drain-source voltage of the main switch. Because of these factors, this solution can increase complexity and cost of the circuit design, may not be suitable for chip integration, and may not effectively achieve quasi-resonant driving of the main power switch.

In various embodiments, quasi-resonant driving control of a main power switch of a switching power supply can be realized. In one embodiment, a driving control circuit can include: (i) a clamp circuit coupled to a gate of the main power switch, where the clamp circuit is configured to clamp a voltage of the gate to a clamping voltage that is greater than a threshold voltage of the main power switch; (ii) a valley voltage detection circuit configured to activate a valley control signal when a drain-source voltage of the main power switch is at a resonance valley level; and (iii) a source voltage control circuit configured to reduce a voltage of a source of the main power switch to turn on the main power switch in response to the valley control signal being activated.

Figure 2:
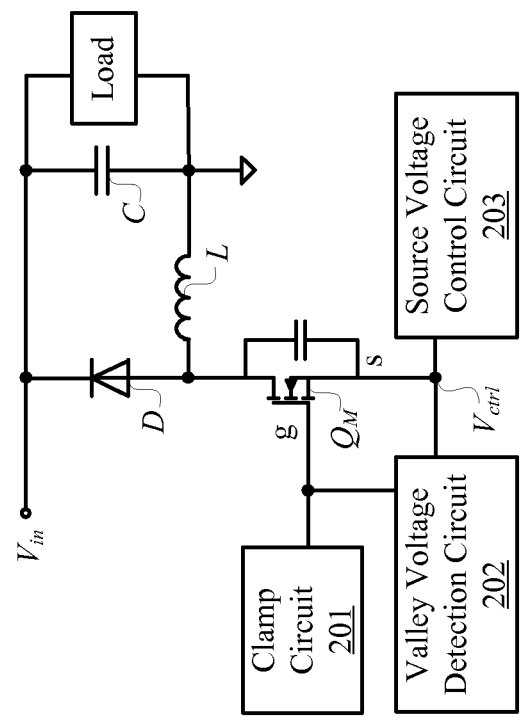
FIG. 2 is a schematic block diagram of a first example source driving control circuit in accordance with embodiments of the present invention.

Referring now FIG. 2, shown is a block schematic diagram of a first example source driving control circuit in accordance with embodiments of the present invention. In this particular example, the topology of the power stage circuit is a floating buck circuit structure; however, other power stage topologies (e.g., flyback converter, single-ended primary-inductor converter [SEPIC] chopper circuit, etc.) can be employed in certain embodiments. In this example, the driving control circuit can include clamp circuit 201, valley voltage detection circuit 202, and source voltage control circuit 203.

Clamp circuit 201 can connect to a gate of main power switch $Q_M$ to clamp gate voltage $V_g$ at a clamping voltage. The clamping voltage can be a predetermined (e.g., user programmed) voltage, and may have a value that is greater than a threshold voltage (e.g., a threshold voltage) of main power switch $Q_M$. Valley voltage detection circuit 202 can connect to main power switch $Q_M$ in order to detect drain-source voltage $V_{ds}$ of main power switch $Q_M$. When drain-source voltage $V_{ds}$ reaches a resonance valley level (e.g., a valley or local minimum value), voltage detection circuit 202 can activate (e.g., by generating a pulse or one-shot signal) valley control signal $V_{ctrl}$.

Source voltage control circuit 203 can receive valley control signal $V_{ctrl}$ to control source voltage $V_s$ of main power switch $Q_M$. At the resonance-valley moment (e.g., when valley control signal $V_{ctrl}$ is activated), the source voltage $V_s$ of main power switch $Q_M$ can be reduced, and the value of gate-source voltage $V_{gs}$ can be greater than the threshold voltage (e.g., threshold voltage) of main power switch $Q_M$ as a result. In this way, quasi-resonant driving of main power switch $Q_M$ can be realized.

In particular embodiments, the gate voltage of main power switch $Q_M$ can be fixed at a predetermined value. Thus, changing source voltage $V_s$ of main power switch $Q_M$ at or substantially close to the moment when resonance voltage reaches valley is detected (and valley control signal $V_{ctrl}$ is activated), main power switch $Q_M$ can be controlled to be turned on. Similarly, to turn off of main power switch $Q_M$, source voltage control circuit 203 can be utilized to increase source voltage $V_s$ to the gate voltage. In this case, the value of gate-source voltage $V_{gs}$ can be less than the threshold voltage, and main power switch $Q_M$ can be controlled to be turned off.

Figure 3A:
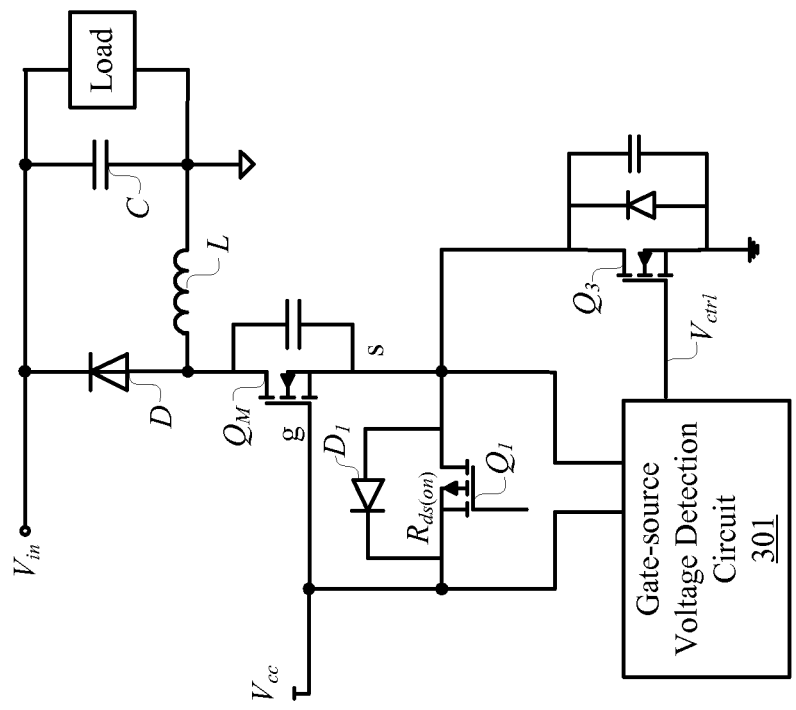
FIG. 3A is a block schematic diagram of a second example source driving control circuit in accordance with embodiments of the present invention.

Referring now to FIG. 3A, shown is a block schematic diagram of a second example source driving control circuit in accordance with embodiments of the present invention. In this example, clamp circuit 201 can include a voltage source with the clamping voltage (e.g., circuit supply voltage $V_{CC}$). Valley voltage detection circuit 202 can include switch $Q_1$ and gate-source voltage detection circuit 301. A first power terminal of switch $Q_1$ can connect to the gate of main power switch $Q_M$, and a second power terminal of switch $Q_1$ can connect to the source of main power switch $Q_M$. For example, gate-source voltage detection circuit 301 can be utilized to detect a voltage of conductive resistor $R_{ds(on)}$ of switch $Q_1$ to obtain gate-source voltage $V_{gs}$ of main power switch $Q_M$. Gate-source voltage detection circuit 301 may generate valley control signal $V_{ctrl}$.

Source voltage control circuit 203 can include switch $Q_3$. A first power terminal of switch $Q_3$ can connect to the source of main power switch $Q_M$, and a second power terminal of switch $Q_3$ can connect ground. The control terminal of switch $Q_3$ can receive valley control signal $V_{ctrl}$. Thus, a state of valley control signal $V_{ctrl}$ can control whether switch $Q_3$ is off or on.

Figure 3B:
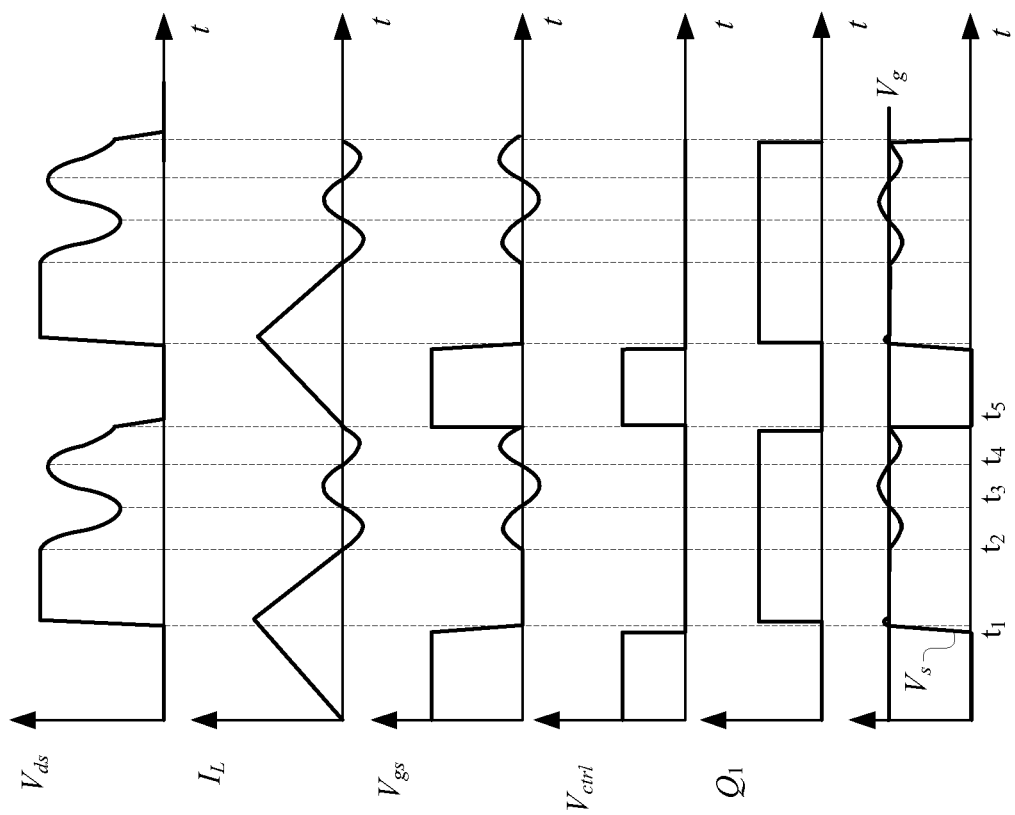
FIG. 3B is a waveform diagram of an example operation of the source driving control circuit shown in FIG. 3A.

Referring now to FIG. 3B, shown is a waveform diagram of an example operation of the source driving control circuit shown in FIG. 3A. At time $t_1$, valley control signal $V_{ctrl}$ can control switch $Q_3$ to be off, current of power stage circuit may begin to charge a parasitic capacitance between the drain and source of switch $Q_3$. This can lead to source voltage $V_s$ of main power switch $Q_M$ beginning to rise, and gate-source voltage $V_{gs}$ beginning to drop below the threshold voltage. Thus, main power switch $Q_M$ may be off, and drain-source voltage $V_{ds}$ of the main power switch can increase to a certain value. When main power switch $Q_M$ is turned off, and source voltage $V_s$ is rising, equivalent diode $D_1$ of switch $Q_1$ can clamp source voltage $V_s$ at a diode drop higher than gate voltage $V_g$. In this way, source voltage $V_s$ can be prevented from rising too high and possibly damaging the device.

After main power switch $Q_M$ is turned off, inductor current $I_L$ in the power stage circuit may begin to drop. At time $t_2$, inductor current $I_L$ can decrease to zero, and inductor L and the output capacitor of main power switch $Q_M$ may produce resonance. During the time interval between time $t_1$ and time $t_2$ before resonance starts, switch $Q_1$ may be turned on. During circuit resonance, because switch $Q_1$ is on, a substantial portion of the resonance current can flow through switch $Q_1$, and gate-source voltage $V_{gs}$ may be produced on conductive resistor $R_{ds(on)}$. Because the drop voltage on conductive resistor $R_{ds(on)}$ may be relatively small (e.g., a few hundred millivolts), the voltage difference between the gate and source of main power switch $Q_M$ may be almost zero, and as a result main power switch $Q_M$ can remain off at this time.

Gate-source voltage detection circuit 301 can detect the voltage on conductive resistor $R_{ds(on)}$, and may output valley control signal $V_{gs}$ when gate-source voltage $V_{gs}$ crosses zero in a negative-going direction. For example, this zero-crossing time or resonance-valley moment is shown in FIG. 3B at time $t_3$ and also at time $t_5$. Switch $Q_3$ may be turned on when valley control signal $V_{ctrl}$ is activated (e.g., goes high), and discharge or pull source voltage $V_s$ to ground. This action can lead to gate-source voltage $V_{gs}$ being greater than the threshold voltage, and main power switch $Q_M$ may realize resonance conduction. In addition, when switch $Q_3$ is on, control switch $Q_1$ can be turned off in order to avoid power supply voltage $V_{CC}$ (the clamping voltage) being short-circuited to ground.

In this example, an equivalent diode $D_1$ of switch $Q_1$, and conductive resistor $R_{ds(on)}$ can be employed. In some cases, an additional diode and resistor can also be added with the cathode and anode of the added diode being respectively connected to the gate and source of main power switch $Q_M$. Switch $Q_1$ can connect in series with the additional resistor, and switch $Q_1$ and the additional resistor can be connected in parallel with the additional diode.

In particular embodiments, a resonance-valley moment can be detected without auxiliary windings to facilitate chip integration, and to reduce size and cost of the overall circuit. By accurately detecting the resonance valley moment in this fashion, quasi-resonant driving of the main power switch of a switching power supply or converter can be realized.

Figure 3C:
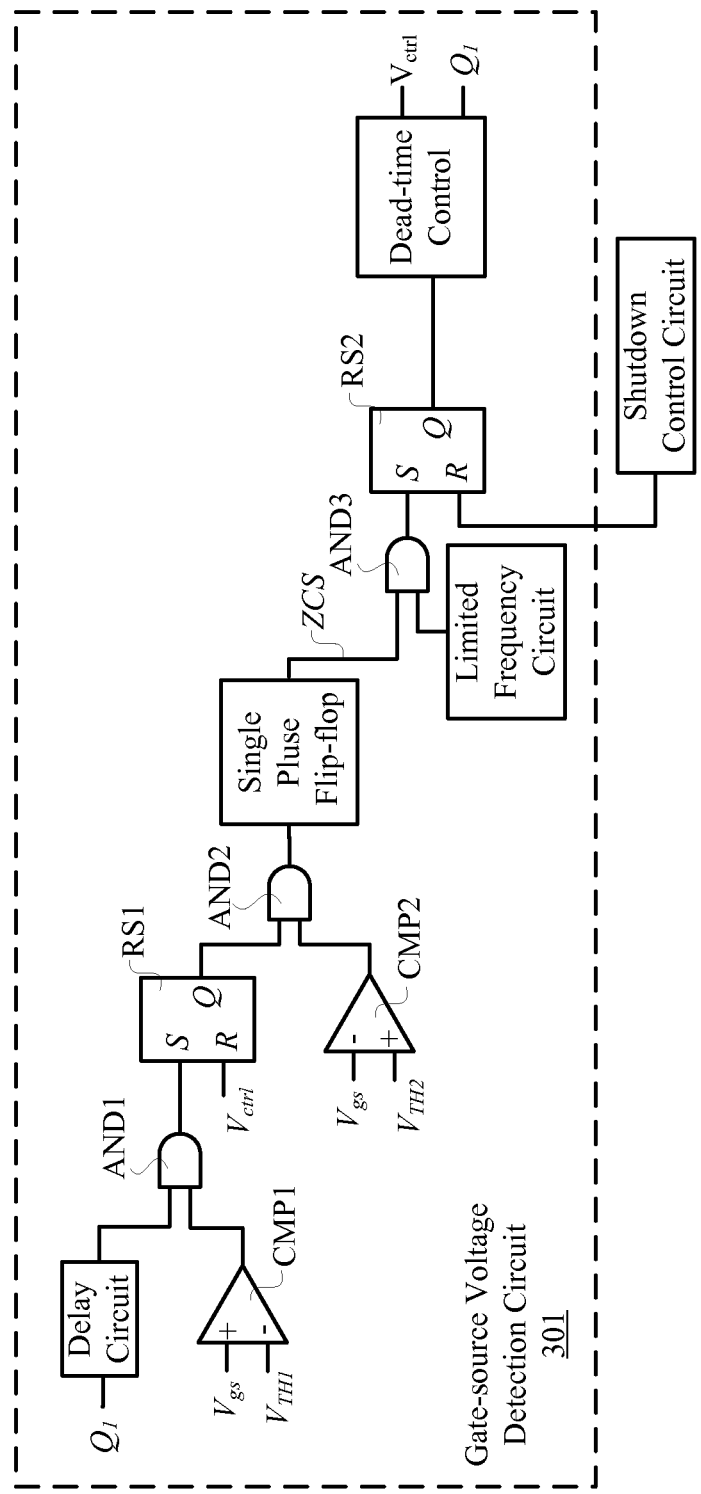
FIG. 3C is a schematic block diagram of an example source voltage detection circuit.

Referring now to FIG. 3C, shown is an example implementation of gate-source voltage detection circuit 301. In this example gate-source voltage detection circuit 301, the non-inverting input terminal of comparator CMP1 can receive gate-source voltage $V_{gs}$, and the inverting input terminal of comparator CMP1 can receive threshold voltage $V_{TH1}$. For example, threshold voltage $V_{TH1}$ can be set to a predetermined value (e.g., a few hundred millivolts). The inverting input terminal of comparator CMP2 can receive gate-source voltage $V_{gs}$, and the non-inverting input terminal of comparator CMP2 can receive threshold voltage $V_{TH2}$. For example, threshold voltage $V_{TH2}$ can be set to a predetermined value that is less than threshold voltage $V_{TH1}$ (e.g., near zero volts).

AND-gate AND1 can receive the control signal of switch $Q_1$ after being delayed by a delay circuit, and the output of comparator CMP1. In order to prevent noise produced by small oscillation effects of $V_{gs}$, CMP1 can output a signal after main power switch $Q_M$ is turned off, and control signal of first switch $Q_1$ may be delayed. Therefore, when the output signal of AND-gate AND1 is high, this can indicate that switch $Q_1$ is on. At this time, gate-source voltage $V_{gs}$ may be greater than threshold voltage $V_{TH1}$, which can be at a time or moment when inductor L and output capacitor of main power switch $Q_M$ are in resonance. Also, the signal of flip-flop RS1 can be high at this time.

When the output of comparator CMP2 is high, this may indicate that gate-source voltage $V_{gs}$ is less than threshold voltage $V_{TH2}$. Because threshold voltage $V_{TH2}$ may be set to near zero, this can indicate a negative-going direction zero-crossing of gate-source voltage $V_{gs}$. This timing can correspond to a resonance-valley or localized minimum moment of drain-source voltage $V_{ds}$. In such case, the output of AND-gate AND2 can go high, intermediate signal ZCS can be activated by a single pulse flip-flop, such as a one-shot circuit.

AND-gate AND3 can receive intermediate signal ZCS and a limited frequency signal from a limited frequency circuit. Such a limited frequency signal can control main power switch $Q_M$ to turn on at different resonance-valley moments. Valley control signal $V_{ctrl}$ can be output by flip-flop RS2 based on the output of AND-gate AND3, which may also turn on switch $Q_3$, and thus turn on main power switch $Q_M$. Also at this time, switch $Q_1$ may be turned off, and a predetermined amount of dead time can exist between driving signals of switches $Q_1$ and $Q_3$.

The example gate-source voltage detection circuit and control circuit discussed above is only one of numerous possible implementations. As those skilled in the art will recognize, various modifications can be made, and other components and techniques with a same or function, circuit structures, and/or layouts can also be accommodated in particular embodiments.

Figure 4A:
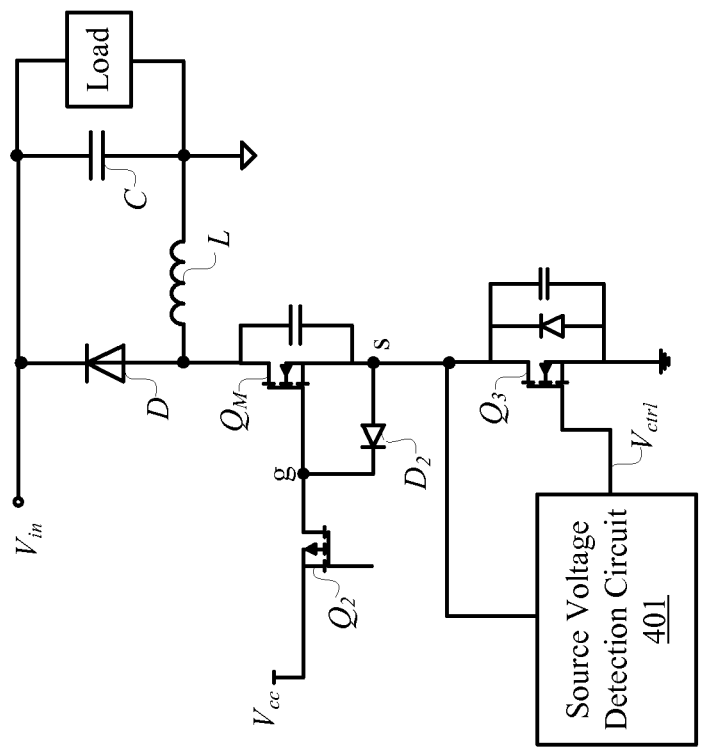
FIG. 4A is a block schematic diagram of a third example source driving control circuit in accordance with embodiments of the present invention.

Referring now to FIG. 4A, shown is a schematic block diagram of a third example source driving control circuit according to embodiments of the present invention. Here, operating principles of source voltage control circuit 203 may be the same or similar to those discussed above with reference to FIG. 3A, however portions of clamp circuit 201 and valley voltage detection circuit 202 may be different in this particular example.

For example, clamp circuit 201 can include switch $Q_2$ with a first power terminal of switch $Q_2$ being connected to circuit power supply voltage or clamping voltage $V_{CC}$. A second power terminal of switch $Q_2$ can connect to the gate of main power switch $Q_M$. Valley voltage detection circuit 202 can include diode $D_2$ and source voltage detection circuit 401. The cathode and anode of diode $D_2$ can be respectively connected to the gate and source of main power switch $Q_M$. Source voltage detection circuit 401 can receive source voltage $V_s$, and may generate a valley control signal $V_{ctrl}$ at a positive-going direction zero-crossing time of source voltage $V_s$.

Figure 4B:
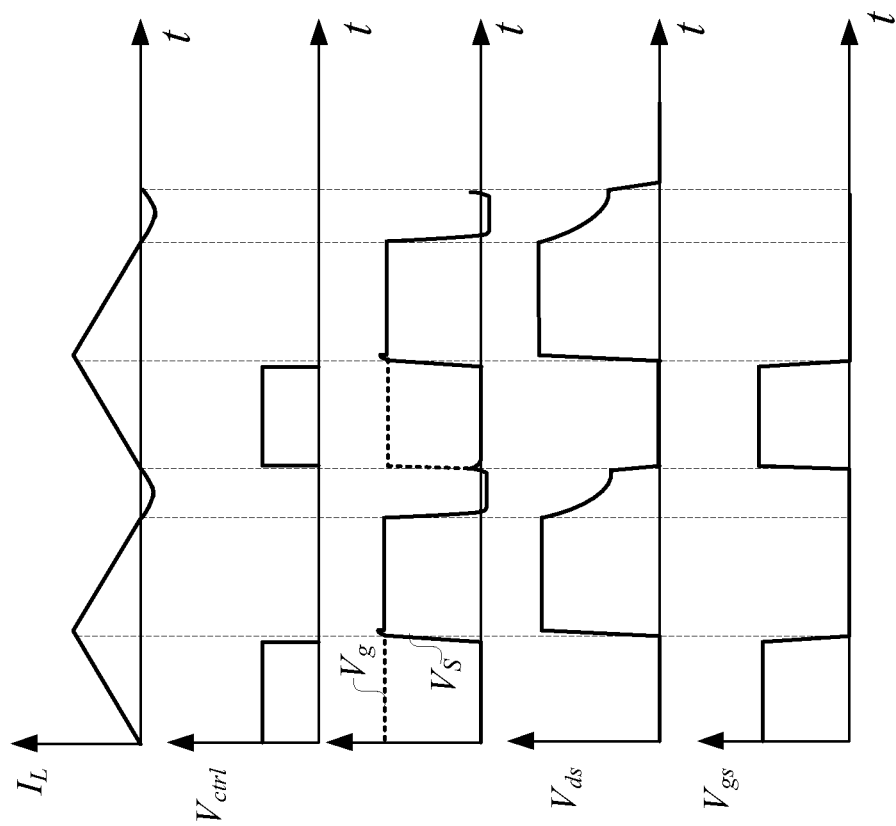
FIG. 4B is a waveform diagram of an example operation of the source driving control circuit shown in FIG. 4A.

Reference may now be made in detail to operating examples of the valley voltage detection circuit, examples of which are illustrated in the waveform diagram shown in FIG. 4B. Diode $D_2$ can be used to clamp source voltage $V_s$ when main power switch $Q_M$ is off, or in the process of turning off. After main power switch $Q_M$ is turned off and inductor current $I_L$ of the power stage circuit drops to zero, inductor L and the output capacitor of the main power switch can generate resonance.

Before the resonance, gate-source voltage $V_{gs}$ may be zero. Because the parasitic capacitance value between a drain and source of a switch may be larger than other parasitic capacitance sources, during the process of resonance, a substantial amount or almost all of the resonance current can flow through the parasitic capacitance between drain and source of switch $Q_3$ and main power switch $Q_M$. Only a relatively small portion of the resonance current may flow through the parasitic capacitance between the gate-drain and the parasitic capacitance between the gate-source of main power switch $Q_M$. The gate-source voltage $V_{gs}$ may be substantially unchanged during the process of resonance, and main power switch $Q_M$ can remain off. In addition, switch $Q_2$ can remain off during resonance in order to prevent leakage current flowing out of circuit power supply voltage $V_{CC}$.

The parasitic capacitance between the drain and source of switch $Q_3$ can be relatively small, so the source voltage $V_s$ can drop quickly to a negative value after resonance begins. At this time, gate voltage $V_g$ clamped by source voltage $V_s$ via diode $D_2$ can also drop to a negative value. When drain-source voltage $V_{ds}$ reaches a resonance-valley moment, as a result of resonance current positive-going direction zero-crossing, the parasitic capacitance between drain and source of power switch $Q_3$ can be quickly charged, and gate voltage $V_g$ and source voltage $V_s$ may soon become positive values. Source voltage detection circuit 401 can receive source voltage $V_s$, and may activate valley control signal $V_{ctrl}$ at the positive-going direction zero-crossing time of source voltage $V_s$.

Valley control signal $V_{ctrl}$ can control switches $Q_2$ and $Q_3$, such that circuit power supply or clamp voltage $V_{CC}$ can charge the parasitic capacitance between the gate and source of main power switch $Q_M$ again. This can lead to the voltage of the parasitic capacitance between the gate and source of main power switch $Q_M$ being larger than the threshold voltage in order to turn on main power switch $Q_M$ is by way of resonance.

Switch $Q_2$ can remain on when main power switch $Q_M$ is on, and switch $Q_2$ can remain off during the resonance process. For the convenience of control, the switching operation of switch $Q_2$ can be substantially the same as the switching operation of switch $Q_3$. Due to the switch function of switch $Q_2$, power losses of the circuit power supply voltage can be further reduced. In addition, valley control signal $V_{ctrl}$ can be activated by detecting the source voltage $V_s$ of main power switch $Q_M$, as opposed to sampling the voltage between gate and source using a sampling resistor. In this way, the detection circuit implementation can be simplified.

Figure 5A:
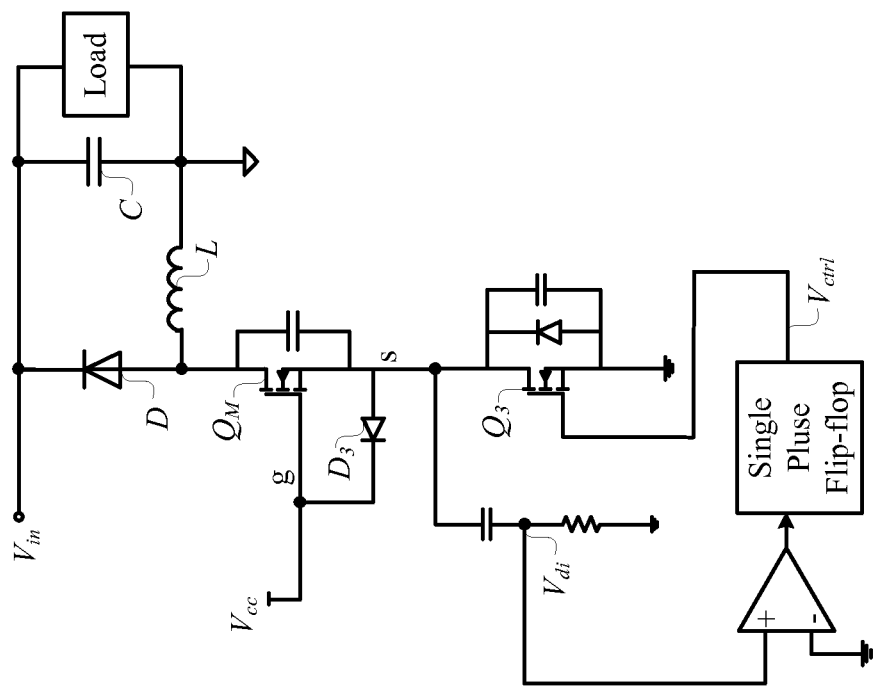
FIG. 5A is a schematic block diagram of a fourth example source driving control circuit in accordance with embodiments of the present invention.

Referring now to FIG. 5A, shown is a block schematic diagram of a fourth example source driving control circuit in accordance with embodiments of the present invention. In this example, valley voltage detection circuit 202 can include diode $D_3$, and an RC differential circuit formed by capacitors and resistors. Valley voltage detection circuit 202 can also include a zero-crossing detection circuit realized by a zero-crossing comparator and a single pulse flip-flop.

The cathode and anode of diode $D_3$ can respectively connect to the gate and source of main power switch $Q_M$. The RC differential circuit can receive source voltage $V_s$ for differential operation, and the voltage at a common node of the capacitor and resistor of the differential circuit may be regarded as differential voltage $V_{di}$. The non-inverting input terminal of the zero-crossing comparator can receive differential voltage $V_{di}$, the inverting input terminal of the comparator can connect to ground, and output terminal of the comparator can connect to the single pulse generator.

Figure 5B:
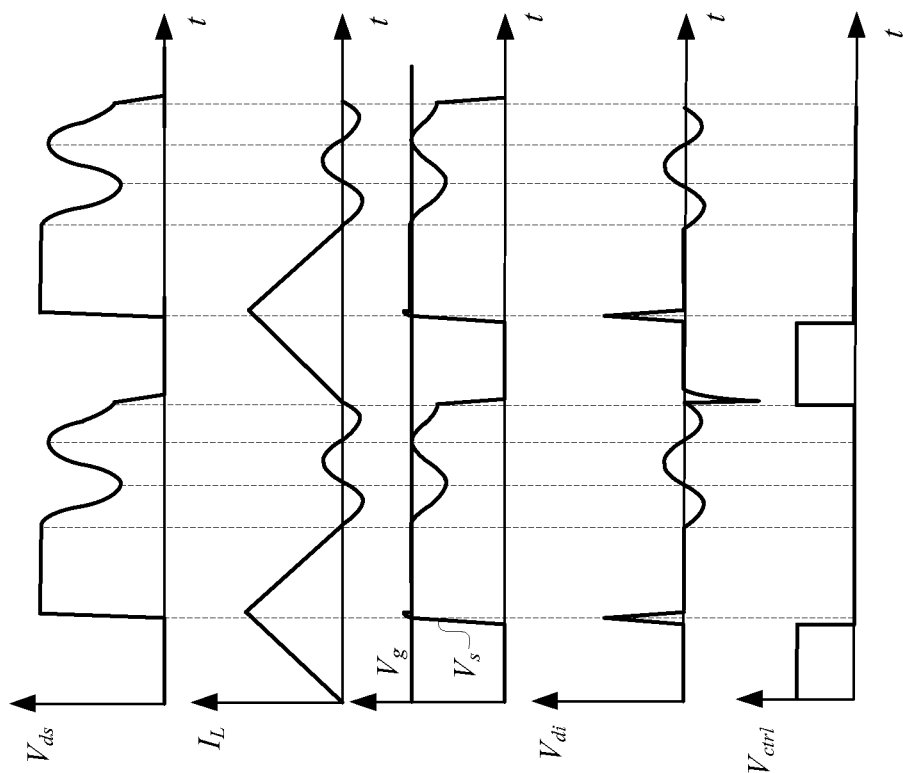
FIG. 5B is a waveform diagram of an example operation of the source driving control circuit shown in FIG. 5A.

Referring now to FIG. 5B, shown are example operational waveforms. The differential output can correspond to a moment when drain-source voltage $V_{ds}$ reaches a valley as a positive-going direction zero-crossing time of differential voltage $V_{di}$. When the zero-crossing detection circuit detects the positive-going direction zero-crossing time of differential voltage $V_{di}$, the zero-crossing detection circuit can activate valley control signal $V_{ctrl}$ to turn on main power switch $Q_M$.

Reference may now be made to an example of a source driving control method. In one embodiment, a method can include: (i) clamping a gate voltage of a main power switch at a clamping voltage that is greater than a threshold voltage of the main power switch; (ii) activating a valley control signal when a drain-source voltage of the main power switch reaches a resonance valley level; and (iii) reducing a source voltage of the main power switch to turn on the main power switch in response to the valley control signal being activated.

Figure 6:
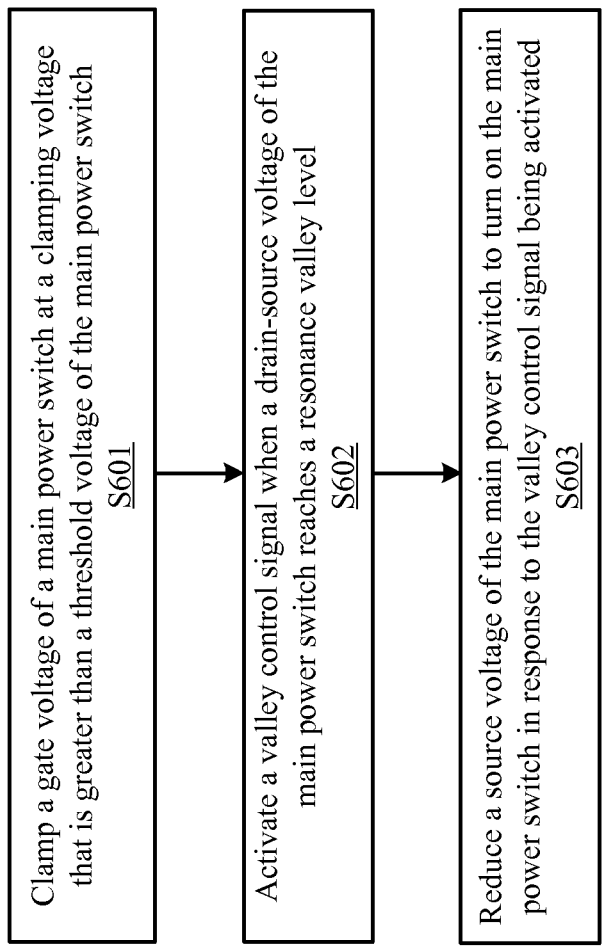
FIG. 6 is a flow diagram of an example source driving control method in accordance with embodiments of the present invention.

Referring now to FIG. 6, shown is a flow diagram of an example source driving control method in accordance with embodiments of the present invention. At S601, a gate voltage of a main power switch may be clamped at a clamping voltage. For example, the value of the clamping voltage can be greater than a threshold voltage of main power switch. At S602, when a drain-source voltage of the main power switch reaches a resonance valley, a valley control signal can be activated. At S603, in response to the valley control signal, a source voltage of the main power switch can be reduced such that a gate to source voltage of the main power switch is greater than threshold voltage. Thus at the resonance valley moment, quasi-resonant driving of the main power switch can be realized.

In one example of generating the valley control signal, the gate-source voltage of the main power switch can be detected, and the valley control signal may be activated at a negative-going direction zero-crossing time of the gate-source voltage. In another example of generating the valley control signal, the source voltage of the main power switch can be detected, and the valley control signal can be activated at a positive-going direction zero-crossing time of source voltage. In yet another example of generating the valley control signal, a differential voltage can be received, and a moment when the drain-source voltage of the main power switch reaches valley can correspond to a positive-going direction zero-crossing time of the differential voltage.

The embodiments were chosen and described in order to best explain the principles of the invention and its practical applications, to thereby enable others skilled in the art to best utilize the invention and various embodiments with modifications as are suited to the particular use contemplated. It is intended that the scope of the invention be defined by the claims appended hereto and their equivalents.

What is claimed is:

1. A driving control circuit, comprising:
   a) a clamp circuit coupled to a gate of a main power switch, wherein said clamp circuit is configured to clamp a voltage of said gate to a clamping voltage that is greater than a threshold voltage of said main power switch;
   b) a valley voltage detection circuit configured to activate a valley control signal when a drain-source voltage of said main power switch is at a resonance valley level; and
   c) a source voltage control circuit configured to reduce a voltage of a source of said main power switch to turn on said main power switch in response to said valley control signal being activated.

2. The driving control circuit of claim 1, wherein said valley voltage detection circuit comprises:
   a) a first switch having first and second power terminals coupled to said gate and said source of said main power switch, wherein said first switch is on during resonance and off when said main power switch is conductive; and
   b) a gate-source voltage detection circuit configured to detect a gate-source voltage of said main power switch, and to activate said valley control signal at a negative-going direction zero-crossing time of said gate-source voltage.

3. The driving control circuit of claim 2, wherein said valley voltage detection circuit further comprises:
   a) a first diode having a cathode coupled to said gate of said main power switch, and an anode coupled to said source of said main power switch; and
   b) a first resistor coupled in series with said first switch, wherein said first resistor and said first switch are coupled in parallel to said first diode.

4. The driving control circuit of claim 1, wherein:
   a) said clamp circuit comprises a second switch coupled between said clamping voltage and said gate of said main power switch, wherein said second switch is off during resonance, and said second switch is on when said valley control signal is activated; and
   b) said valley voltage detection circuit comprises a second diode having a cathode coupled to said gate of said main power switch, and an anode coupled to said source of said main power switch, and wherein said valley voltage detection circuit is configured to activate said valley control signal at a positive-going direction zero-crossing time of said main power switch.

5. The driving control circuit of claim 1, wherein said valley voltage detection circuit comprises:
   a) a third diode having a cathode coupled to said gate of said main power switch, and an anode coupled to said source of said main power switch;
   b) a differential circuit configured to receive said source voltage of said main power switch, and to generate a differential voltage; and
   c) a zero-crossing detection circuit configured to receive said differential voltage, and to activate said valley control signal when said differential voltage crosses zero in a positive-going direction that corresponds to when said drain-source voltage of said main power switch reaches said valley resonance level.

6. The driving control circuit of claim 1, wherein said clamp circuit comprises a voltage source coupled to said clamping voltage.

7. The driving control circuit of claim 1, wherein said source voltage control circuit comprises a third switch having a first power terminal coupled to said source of said main power switch, a second power terminal coupled to ground, and a control terminal of said third switch coupled to said valley control signal.

8. A method, comprising:
  a) clamping a gate voltage of a main power switch at a clamping voltage that is greater than a threshold voltage of said main power switch;
  b) activating a valley control signal when a drain-source voltage of said main power switch reaches a resonance valley level; and
  c) reducing a source voltage of said main power switch to turn on the main power switch in response to said valley control signal being activated.

9. The method of claim 8, wherein said activating said valley control signal comprises:
  a) detecting a gate-source voltage of said main power switch; and
  b) activating said valley control signal when said gate-source voltage crosses zero in a negative-going direction.

10. The method of claim 8, wherein said activating said valley control signal comprises:
  a) detecting said source voltage of said main power switch; and
  b) activating said valley control signal when said source voltage crosses zero in a positive-going direction.

11. The method of claim 8, wherein said activating said valley control signal comprises:
  a) generating a differential voltage by performing a differential operation of said source voltage, a differential voltage is received; and
  b) activating said valley control signal when said differential voltage crosses zero in a positive-going direction that corresponds to when said drain-source voltage of said main power switch reaches said valley resonance level.

* * * * *